United States Patent [19]

David

[11] Patent Number: 4,998,745
[45] Date of Patent: Mar. 12, 1991

[54] SAFETY QUICK HITCH

[76] Inventor: John David, Apt. 1, 542 E. 600 North, Spanish Fork, Utah 84660

[21] Appl. No.: 433,797

[22] Filed: Nov. 9, 1989

[51] Int. Cl.$^5$ .............................................. B60D 1/26
[52] U.S. Cl. ....................................... 280/508; 280/510
[58] Field of Search ............... 280/477, 504, 507, 508, 280/510

[56] References Cited

U.S. PATENT DOCUMENTS

| | | | |
|---|---|---|---|
| 2,441,285 | 5/1948 | Pfeiffer | 280/508 |
| 2,478,736 | 8/1949 | Balzer | 280/508 |
| 2,844,390 | 7/1958 | Smith | 280/505 |

FOREIGN PATENT DOCUMENTS

| | | | |
|---|---|---|---|
| 1147898 | 12/1957 | Fed. Rep. of Germany | 280/508 |
| 785518 | 8/1935 | France | 280/508 |

*Primary Examiner*—Charles A. Marmor
*Attorney, Agent, or Firm*—Stephen D. Carver

[57] ABSTRACT

A safety quick-hitch system for coupling over-the-road tractors to utility trailers. A rigid mounting plate is secured to the tow vehicle in place of a conventional pintle-hook hitch assembly. Outwardly flaring walls extend horizontally forwardly from the mounting plate to define a drawbar-receptive mouth. A dual-diameter piston is slidably disposed within a cylindrical bore which perpendicularly intersects the mouth and may be displaced between a clearance position clearing the mouth and a deployed position obstructing the mouth and engaging the drawbar gudgeon. A mechanical trigger assembly slidably disposed within the mouth controls a slidable planar retainer. The retainer engages the piston and selectively activates it in response to deflection of the trigger by the entering drawbar gudgeon. As the drawbar gudgeon enters the hitch mouth, the gudgeon forcibly contacts the trigger and deflects it rearwardly a predetermined depth roughly equivalent to one-fourth the outer diameter of the gudgeon. At that point, the retainer is drawn back out of engagement with the piston, which drops into its deployed position and penetrates the gudgeon to lock the drawbar in position. A safety latch is automatically released when the piston body drops and locks the piston in its deployed position. Flexible cables link the safety latch and the piston to a remote control assembly to facilitate manual deactivation of the hitch from within the interior of the two vehicle.

15 Claims, 2 Drawing Sheets

SAFETY QUICK HITCH

BACKGROUND OF THE INVENTION

The present invention relates generally to safety hitches for coupling conventional highway trailers to tractors or to one another in tandem. More specifically, the present invention is directed to an improved safety trailer hitch which facilitates automatic coupling of trailer and tractor by the driver without manual intervention and the resultant risk of human injury. The invention is believed best classified in U.S. utility class 213, subclass 86.

Trucking has become a major industry in the United States. As the industry has grown and developed, a great number of devices have been introduced for enhancing both the safety and the simplicity of tractor-trailer operation. It will be appreciated that the use of inadequate and unsure trailer hitches in the past has resulted in numerous serious and fatal accidents on our highways. In recent years, more complex hitching systems have been developed to overcome previous safety hazards, but their use typically requires increased manual intervention in the tractor-trailer coupling process. Consequently, labor costs and the frequency of personal injuries resulting from manual coupling operations increase. Hence, advances in safety have proved very costly to truckyard operators.

In the experience of those familiar with prior art pintle hitch systems for tractor-trailer coupling, it is usually necessary for the driver to carefully maneuver the tractor into straight alignment with the trailer hitch to effectuate a proper coupling The truck driver must back the tractor generally in the direction of the stationary trailer. It is thus very difficult to achieve satisfactory alignment of the hitch and the trailer. Proper alignment is even more difficult to obtain where two or more trailers are to be hooked in tandem. Because exact alignment is rarely accomplished in this manner, manual intervention in the hitching process is nearly always necessary. For example, time and motion analyses conducted with typical pintle-hook hitching systems indicated that a driver will need to dismount from the tractor on the average of eleven times in the process of coupling and uncoupling two trailers. Typical coupling time is estimated at roughly one hour, where numerous such attempts to achieve proper alignment are necessary. Uncoupling time typically runs thirty to fifty minutes with these systems.

It would thus seem desirable to provide a hitching system which would readily guide the driver to attain proper alignment of the trailer drawbar with the hitch as he maneuvers the vehicle. It is particularly desirable to provide a hitching system which can be safely connected entirely without or at least with minimal manual intervention by the driver or other truckyard workers.

To achieve drawbar-hitch alignment, commercial trucking operations typically use a trailer dolly associated with a tow vehicle known as a "yard-dog" which can move a trailer around the truckyard or loading area into relatively close alignment for connection to a desired tractor hitch. However, even with the aid of such tow devices, precise hitching alignment is difficult to achieve. Moreover, once the tow device is removed, the loaded dolly cannot be moved by a truckyard worker to perfect alignment.

As a result, truckyard workers will typically apply whatever tool or device is available to them to force the trailer tongue into the hitch. Hammering the hitch or pounding the tongue into position often results in permanent structural damage to the hitch which may affect the quality and safety of the connection. Moreover, such techniques greatly increase the likelihood of injury to the worker's hands and arms. Additionally, if the drawbar of a pintle-hook hitch system should drop during installation, for example, the operator's legs or feet may be seriously injured.

In the prior art, a wide variety of hitching devices have been developed to facilitate coupling of utility trailers to highway tractors for long distance hauling. Representative of prior art safety hitch technology presently in use are the hook hitches illustrated in U.S. Pat. No. 4,279,431, issued on July 21, 1981 to Schott; and, in U.S. Pat. No. 4,492,386, issued to Roberts on Jan. 8, 1985. Such hitches typically comprise a rigid tongue-receptive jaw operatively associated with a lock mechanism which may be locked upon or about a trailer tongue.

For example, the Schott '431 trailer hook includes a spring-biased release latch which must be manually actuated by pressure applied by a truckyard worker. As will be appreciated, the release of the tensioned lock mechanism commonly results in injuries to the worker's hand either when the locking mechanism is pushed out of the interior of the trailer hook housing or when the latch rebounds back into its resting position.

The Roberts '386 device is a pintle hook hitch which includes a manually actuable pivotal locking mechanism. The locking mechanism comprises a retainer arm adapted to close the jaw of the trailer hook upon the hitch associated with a pivoting latch body. To prevent the worker's hands from contacting or interfering with the spring-biased retainer arm, the Roberts device includes an actuator latch positioned upon the lower portion of the hitch and spaced apart from the retainer arm. The free-swinging pivoting latch is adapted to automatically swing into locking position under the force of gravity when the worker releases the actuator latch.

Tractor-trailer hitches which embody the principles set forth in the aforementioned patents and which are presently available on the market include the Premier Model 270 Rear Hitch (Part No. 15-0-29); Holland Model T-60-AL Rear Hitch (Part No. 15-0-35); and, the Trailmobile Rear Hitch (Part No. 15-0-25).

One major disadvantage of such prior art locking hitch systems is that they require manual actuation by the driver or truckyard worker. There is also substantial risk with the use of such devices that the driver or worker will, through inadvertence, inattentiveness, or mere haste fail to secure the locking mechanism into position before driving the vehicle. Such failure is particularly likely where improper hitch alignment requires the worker to force the connection and makes locking extremely difficult or impossible. Without proper safety locking mechanisms deployed, even the most complex prior art hitches are unsafe. Hence it would seem desirable to provide an automatic coupling safety hitch assembly which automatically engages the safety locking mechanism when it is connected. None of the prior art hitches known to us employ such a safety feature.

Various types of automatic locking couplings have been known and used previously in the railroad industry. Typical of such couplings is U.S. Pat. No.

4,311,244, issued to Hindin et al. on Jan. 19, 1982. However, such technology finds little application in the trucking industry, since it is typically extremely complex and is not practical for adaptation to conventional tractor-trailer hitching systems. None of the prior art known to me has successfully incorporated or adapted the broad concepts applied in railroad coupling technology to tractor-trailer hitching systems. Hence it is desired to provide a tractor-trailer hitching system which incorporates some of the most advantageous safety features commonly used and known in the railroad industry.

SUMMARY OF THE INVENTION

This invention comprises an improved safety hitch system for coupling over-the-road tractors to utility trailers adapted to replace conventional pintle-hook hitch assemblies. The system preferably comprises a rigid, generally rectangular hitch housing mounted upon the rear of the tractor. The walls of the hitch housing define a flared mouth oriented generally horizontally for receiving and centering the drawbar of a conventional trailer. Preferably a generally cylindrical bore perpendicularly intersects the hitch mouth and houses a slidable, dual-diameter piston. The piston may be vertically displaced between a raised or "clearance" position in which the hitch mouth is unobstructed, and a lowered or "deployed" position in which the piston obstructs the mouth and engages the gudgeon of the drawbar.

The piston is retained in its raised, clearance position preferably until mechanically released by a tensioned trigger assembly slidably mounted within the throat of the hitch mouth. The trigger assembly comprises a trigger body slidably associated with a rigid retainer plate. The retainer plate engages the lower end of the piston to retain it in its deployed position. The retainer plate has a downwardly extending follower which is received within an elongated follower slot defined in the upper surface of the trigger body. As the drawbar gudgeon enters the hitch mouth, the gudgeon forcibly contacts the trigger body and deflects it rearwardly. When the trigger is deflected a predetermined depth corresponding to roughly one fourth the outer diameter of a conventional drawbar gudgeon, it forcibly contacts the retainer follower, and forces the retainer plate backwardly out of contact with the piston body. When the retainer is thus deflected by the drawbar gudgeon, the piston is released and drops into its deployed position. Thus the piston automatically penetrates the center of the gudgeon and locks the drawbar into position within the mouth.

A tensioned safety latch is automatically released when the piston body drops and locks the piston in its deployed position to prevent upward vertical displacement. Shoulders defined at the base of the piston housing prevent further downward vertical displacement of the piston. Because the safety latch is thus automatically engaged when a hitch is effectuated, neither acts of negligence or inadvertence by the operator nor physical forces acting on the piston during travel will undermine the safe operation of the tractor-trailer unit at highway speeds.

A flexible control cable associated with the piston and a flexible safety cable associated with the safety latch facilitate manual deactivation of the hitch where desired. A mechanical switch mechanism associated with the trigger links the assembly to an electronic control panel positioned remotely, preferably within the interior of the tow vehicle.

Hence it is a fundamental object of the present invention to provide a safety hitch which facilitates automatic coupling of a trailer to a tractor.

A further basic object of the present invention is to provide a hitch coupling system which replaces previous pintle-hook hitches for towing trailers equipped with a drawbar.

A similar basic object of the present invention is to provide a tractor-trailer hitching system which substantially reduces the amount of worker hours required to effectuate a safe trailer coupling and uncoupling.

Another object of the present invention is to provide a trailer quick-hitch system which incorporates an improved safety mechanism to prevent undesired disengagement during high-speed travel.

A further object of the present invention is to provide an improved safety hitch which can be conveniently retrofitted upon existing drawbar systems without the need for reconfiguration.

Yet another object of the present invention is to provide an improved safety hitch which can be selectively released from a remote location.

Still another object of the present invention is to provide a hitch assembly which employs a safety latch which automatically engages when the hitch is connected.

A similar further object of the present invention is to provide a tractor-trailer hitch assembly which effectively assists the driver to readily achieve coupling alignment between the trailer and hitch without dismounting from the tractor.

Another broad object of the present invention is to provide a tractor-trailer safety hitch of the character described which reduces the risk of injury to the driver and truckyard workers commonly associated with the use of conventional trailer hitches.

Still another object of the present invention is to provide a safety hitch system which, when properly connected, automatically engages a safety mechanism to prevent inadvertent release of the hitch during operation.

A further object of the present invention is to provide a safety hitch system of the character described which automatically aligns, engages, and latches the gudgeon of a trailer drawbar with minimal intervention by the operator.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
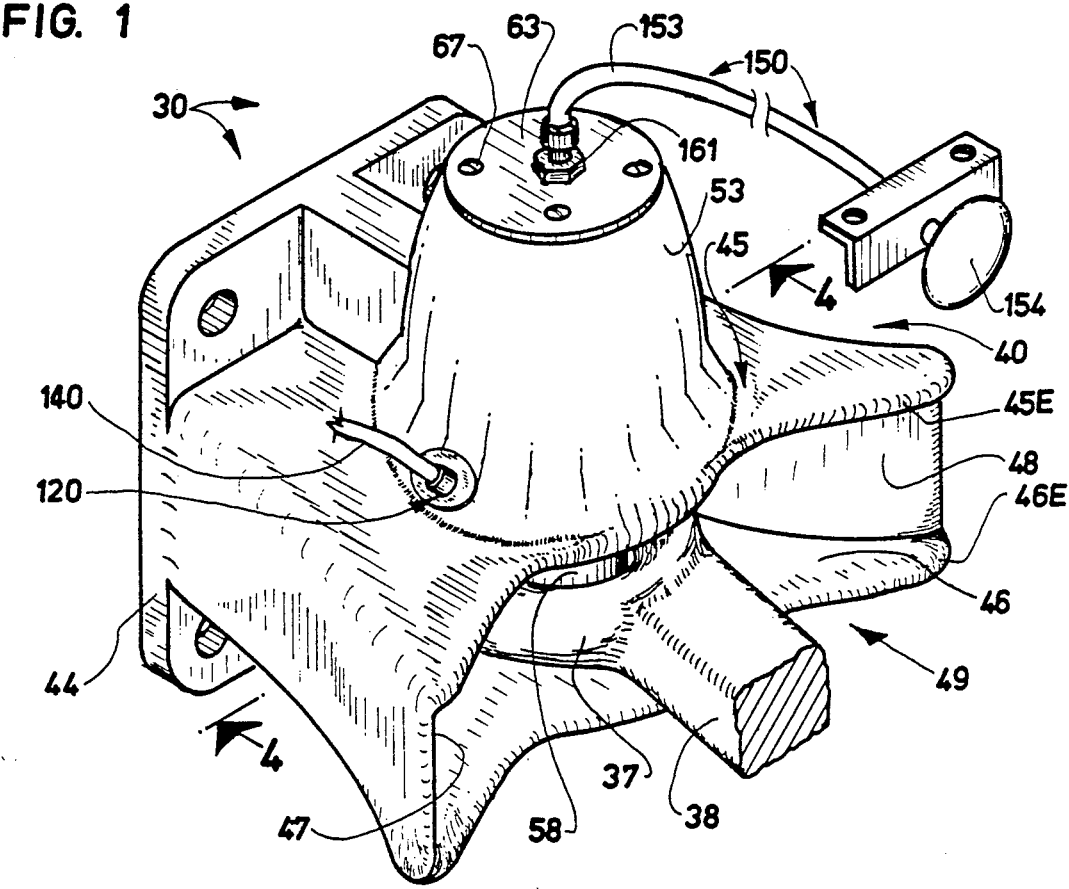
FIG. 1 is a pictorial view illustrating the best mode of my SAFETY QUICK HITCH deployed to engage the gudgeon of a conventional trailer drawbar, and wherein portions are broken away for clarity and brevity.

FIG. 1 of the appended drawings illustrates the best mode of my safety quick hitch assembly, broadly designated by the reference numeral 30. The hitch is illustrated engaging the gudgeon 37 of a conventional utility trailer drawbar 38. Assembly 30 preferably replaces the conventional pintle-hook hitch commonly mounted upon heavy-duty tow vehicles such as over-the-road tractors. It will be appreciated that a conventional drawbar gudgeon comprises a wire of donut-like configuration defining a central latching bore. Assembly 30 mechanically guides the trailer gudgeon 37 into alignment with the hitch to facilitate coupling. As the gudgeon moves into proper alignment within the center of the assembly 30, it activates a mechanical trigger assembly described hereinafter to automatically lock the gudgeon in position. The assembly thus prevents improper or unsafe hitching as well as undesired accidental disengagement of the hitch.

Figure 2:
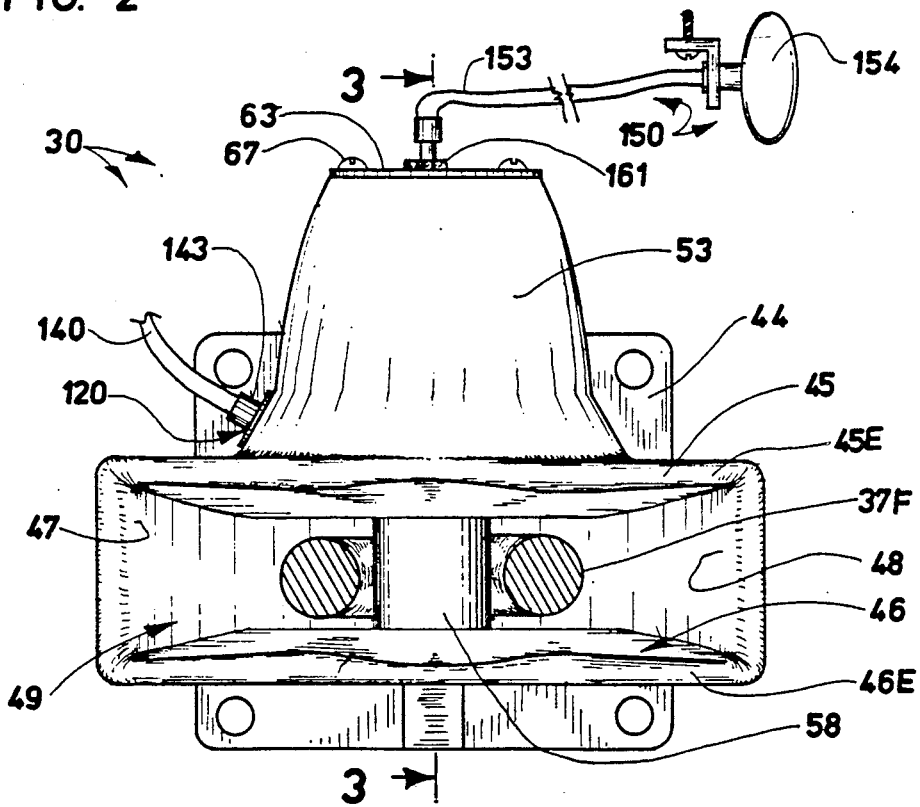
FIG. 2 is a front elevational view thereof, wherein the front portion of the trailer gudgeon is illustrated in section for clarity.

With initial reference directed to FIGS. 1 and 2, assembly 30 generally comprises a rigid hitch housing 40 preferably cast of heavy-duty steel. Housing 40 comprises a rigid, generally vertically disposed mounting plate 44 to be flush-mounted to the rear of the tow vehicle and secured by bolts or other suitable fasteners (not shown). An integral drawbar-receptive, flared mouth 49 extends generally horizontally, outwardly from mounting plate 44. A generally conical casing 53 extends integrally upwardly from mouth 49. As explained in detail hereinafter, assembly 30 secures the trailer gudgeon 37 by means of a piston 58 (FIG. 2) slidably associated with conical casing 53. The piston 58 is activated by a mechanical trigger assembly associated with mouth 49. In the best mode, a safety latch assembly broadly designated by the reference numeral 120 automatically engages to lock piston 58 in its deployed position illustrated in FIG. 2. A control system broadly designated by the reference numeral 150 facilitates convenient deactivation of the hitch from within the tow vehicle or other remote position.

As best viewed in FIG. 2, mouth 49 is defined between generally horizontally disposed, outwardly flaring top wall 45 and bottom wall 46. Walls 45, 46 are maintained in roughly parallel, spaced apart position by a pair of generally vertically disposed, outwardly flaring deflector walls 47, 48. Thus mouth 49 comprises a flared, generally bell-shaped open cavity. In the best mode, the mouth 49 decreases from its widest point at fourteen and one-half inches wide to roughly eight inches wide. The mouth decreases in height from four and one-half inches to roughly three inches at its smallest interior point. Walls 45, 46 define outwardly projecting, contoured edges 45E, 46E. As best viewed in FIG. 3 of the appended drawings, mouth 49 terminates in an internal throat 51, which houses the mechanical trigger assembly described in detail hereinafter.

Figure 3:
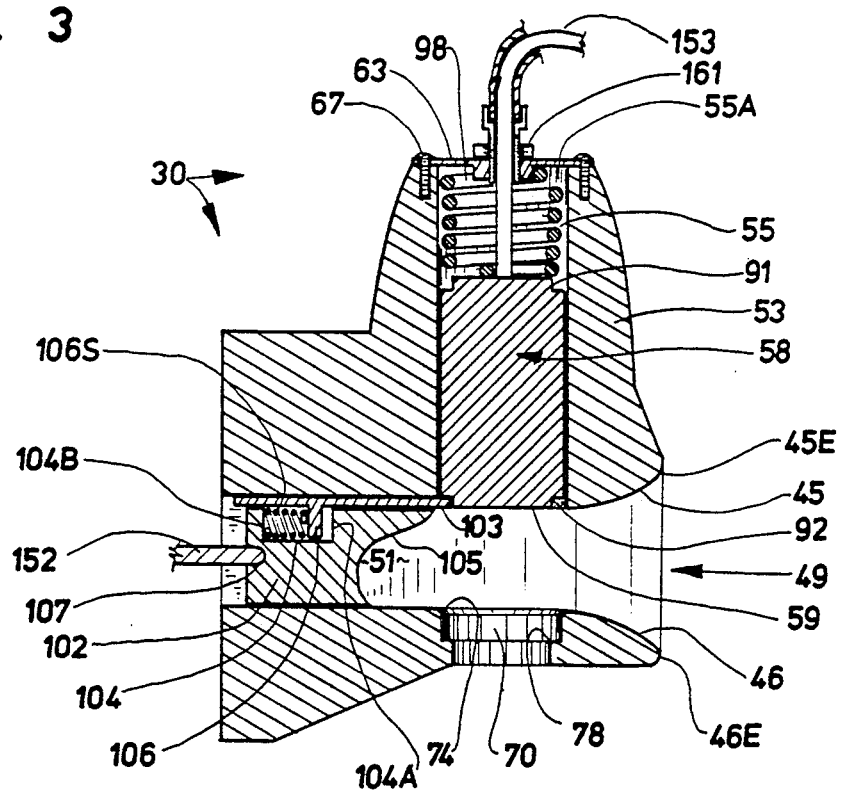
FIG. 3 is a fragmentary, sectional view taken generally along line 3—3 of FIG. 2; and, FIG. 4 is a sectional view taken generally along line 4—4 of FIG. 1.
Figure 4:
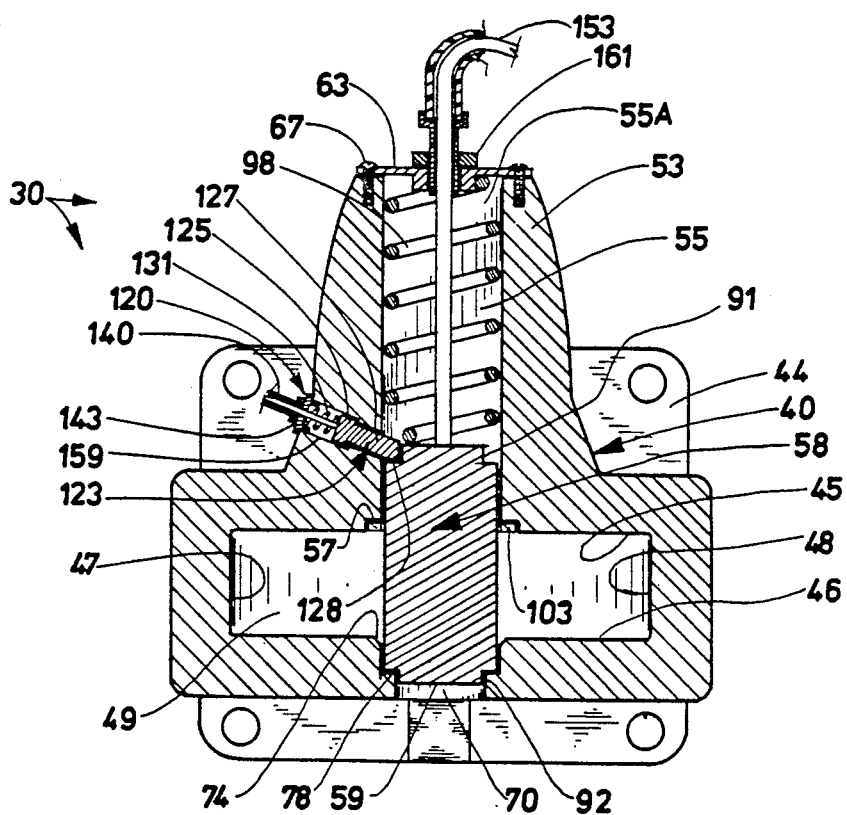

With additional reference now to FIGS. 3 and 4, casing 53 comprises an internally defined, cylindrical, vertically disposed bore 55. Bore 55 defines a path of travel for slidable piston 58. Bore 55 terminates at its interior end in an enlarged diameter, peripheral counterbore 57 (FIG. 4). Counterbore 57 is roughly one-fourth inch larger in diameter than main bore 55. The upper end 55A of bore 55 is capped by a rigid, planar plate 63 mounted atop cylinder casing 53 by appropriate fasteners 67. Plate 63 protects the interiorly disposed piston 58 from the harmful effects of the environment and facilitates access thereto for maintenance and repair.

Bore 55 is axially aligned with a cylindrical, vertical bore 70 defined roughly centrally through bottom wall 46 of housing 40 (FIG. 4). Bore 70 receives the lower end 59 of piston 58 as the piston travels downwardly to engage the trailer gudgeon 37. To facilitate proper alignment of the entering piston 58, bore 70 is provided with a chamfered shoulder 74. The opposite end of bore 70 defines a reduced-diameter portion 78. As best viewed in FIG. 4, portion 78 limits downward travel of piston 58.

Thus bores 55 and 70 cooperate to define a path of travel for piston 58, and the path perpendicularly intersects the generally horizontally disposed mouth 49.

Piston 58 comprises a solid, generally cylindrical piston body having a reduced-diameter top 91 and a similarly reduced-diameter bottom 92. As best viewed in FIG. 4, piston bottom 92 is slidably received within the lower portion of bore 70 extending below bore portion 78. Piston 58 is biased by a flexible spring 98 or similar tensioning device anchored to top 91 and secured at its opposite end to plate 63. When piston 58 is in its clearance position, spring 98 is tightly compressed within bore 55. When piston 58 is released as described below, spring 98 forcefully drives the piston 58 rapidly downwardly into its deployed position. There spring 98 remains in its expanded, quiescent state.

As best viewed in FIG. 3, when piston 58 is retained in its raised or "clearance" position, it is disposed completely within upper bore 55. In the clearance position, piston 58 leaves mouth 49 free and unobstructed. The clearance position is preferably assumed prior to coupling, so that maximum clearance is provided to facilitate insertion of the trailer gudgeon 37 into mouth 49 as described below. As best viewed in FIGS. 2 and 4, piston 58 may be lowered into its "deployed" position, whereby it intersects and blocks mouth 49. In its deployed position, piston 58 penetrates and captures gudgeon 37 within mouth 49. The piston is preferably "deployed" in this quiescent position when the hitch assembly is not in use.

With specific reference directed to FIG. 3, the mechanical trigger assembly broadly designated by the reference numeral 100 is slidably disposed for horizontal displacement within throat 51. Broadly, the trigger assembly 100 activates piston 58 when the assembly is deflected rearwardly by drawbar gudgeon 37 as it penetrates mouth 49. When the trigger assembly is thus deflected beyond a predetermined distance, it mechanically activates the locking mechanism 120 described below to automatically effectuate a safe coupling without manual intervention by truckyard workers.

Trigger assembly 100 comprises a rigid, generally rectangular trigger block 102 operatively associated with a rigid planar retainer 103. Block 102 comprises a curved, generally concave front face 105 conformed to receive the rounded front edge of the forward portion 37F of the drawbar gudgeon 37. Defined within the top of the trigger block 102 is an elongated follower slot 104 comprising an opposing pair of vertical end walls 104A, 104B. In the best mode, follower slot 104 is roughly one and three-eighths inches long.

Retainer 103 is slidably disposed for horizontal displacement within throat 51 along the top of the trigger block. The retainer 103 is preferably four inches long.

The front edge of the retainer 103 defines a concave "yoke" which conforms to the outer periphery of piston end 92. Opposite ends of the retainer yoke slide into counterbore 57 to engage the piston in its clearance position. Retainer 103 further comprises a downwardly extending follower 106 which projects into follower slot 104 of the trigger block 102. A spring 106S or similar tensioning device biases the follower 106 within slot 104.

A notch 107 is defined roughly centrally within the rear face of the trigger block 102 to receive a mechanical switch mechanism 152 which links the trigger block to an external control panel (not shown) associated with the control assembly 150 described hereinafter. The switch mechanism 152, which may be either mechanical or electric, simultaneously activates the safety latch assembly 120.

With particular reference directed to FIG. 4, the safety latch assembly 120 comprises a rigid, dual-diameter locking cylinder 123. The cylinder 123 comprises a generally block-like head 125 and an elongated, reduced-diameter body 127 which terminates in an angular tip 128. Cylinder 123 is slidably disposed within a channel 129 which preferably penetrates conical casing 53. Channel 129 terminates at its interior end in a reduced-diameter portion which communicates with central piston bore 55. Channel 129 intersects bore 55 at a roughly thirty degree angle. When the piston is disposed in its deployed position, the angular tip 128 of the locking cylinder 123 penetrates bore 55 and contacts the shoulder defined by the reduced-diameter piston top 91. Thus the cylinder locks piston 58 in position and prevents undesired upward vertical displacement of the piston during use. When the piston is in the clearance position, the cylinder 123 is driven upwardly out of bore 55 against spring 131 and is disposed entirely within channel 129. The locking cylinder 123 is tensioned by a spring 131. Where desired, the safety latch assembly 120 may optionally be linked to the control assembly 150 for remote actuation as described below.

The control assembly 150 permits the operator to actuate the hitch assembly 30 from within the tractor cab. Control system 150 is linked to piston 58 by a flexible control cable 153. Control cable 153 is preferably screw-fitted into piston top 91. The control cable 153 extends upwardly through bore 55 and penetrates an orifice in cover plate 63, which is sealed by a suitable grommet 161. The locking cylinder 123 is linked to the control system 150 by a flexible safety cable 140. The safety cable 140 is secured within casing 53 by a grommet 143 or similar washer.

Cables 140 and 153 extend to a remote control panel (not shown) preferably positioned within the tow vehicle A control device, such as handle 154 shown in FIGS. 1 and 2, permits the operator to deactivate the hitch by pulling cable 153 and thereby raising piston 58 into its clearance position. It will be appreciated that control system 150 may alternatively be electronically activated. The control system 150 permits the operator to quickly and safely unhitch the trailer without having to leave the tow vehicle. This results in more effective use of time at the unloading point.

Control system 150 also greatly enhances the safety of the assembly 30. In an emergency situation, for example, when the trailer "derails" off a curve into a ravine, it may be necessary for the operator to "dump" the trailer to preserve his life. With prior hitch systems, the trailer would drag the tow vehicle down behind it into the ravine, usually resulting in the operator's death. The present control system would permit the operator to quickly deactivate the hitch while driving to free the tow vehicle from the falling trailer.

The advantages associated with the above-defined novel structure are best appreciated when viewed with respect to the operation of the hitch assembly 30.

OPERATION

To attain a proper and safe coupling with the present assembly, the tow vehicle operator must back the tow vehicle toward the loaded utility trailer, so that mouth 49 of the hitch assembly is generally aligned with trailer drawbar 38. As the tow vehicle backs up closer to the trailer, the drawbar gudgeon 37 enters mouth 49 and is guided by the flared walls into centered position. If the gudgeon is not exactly centered within the mouth, it will be deflected and urged toward the center of the mouth by the flared deflector walls 47, 48.

As the gudgeon enters the mouth, its front wire 37F (FIG. 2) forcibly contacts the contoured face 105 of spring-biased trigger block 102, deflecting the block 102 rearwardly. When the block 102 slides backwardly roughly one-eighth inch, follower wall 104A contacts follower 106. Follower 106 subsequently slides retainer plate 103 backwardly out of counterbore 57 and thus out of contact with piston bottom 92. Follower 106 is biased against further rearward deflection by spring 106S. When the retainer plate is thus withdrawn from engagement with piston 58, the piston is released and forcibly driven downwardly through bore 55 by the force of spring 98. The piston penetrates the trailer gudgeon bore and enters lower bore 70. If piston is deflected somewhat, such as by contact with the gudgeon wire, it will be urged back into correct vertical alignment by shoulder 74 of the lower bore 70.

When the piston 58 is thus activated to its deployed position, locking cylinder 123 is forcibly driven through channel 125 by spring 131. Cylinder 123 then penetrates bore 55 and comes into firm abutment with piston top 91, locking piston 58 in position. Where a control assembly 150 is installed, the safety latch assembly 120 may be immediately activated in response to deflection of switch mechanism 152 associated with the trigger body.

It becomes immediately apparent that the depth of deflection of the trigger assembly must be fairly precisely calculated so that the bore of gudgeon 37 is very nearly centered within mouth 49 before the piston 58 is freed to drop from its clearance position. Otherwise, the piston could be severely damaged by forcible contact with the gudgeon wire and the assembly consequently disabled. The total depth of penetration by the gudgeon is roughly one-half the outer diameter of the gudgeon. The depth of deflection of the trigger assembly would be approximately one-half the gudgeon outer diameter, since roughly half of the gudgeon wire is received within the contoured face 105 of the trigger body before deflection of the retainer plate follower occurs. Thus, in the preferred embodiment, the depth of deflection equals roughly one-fourth the outer diameter of the gudgeon.

When it is desired to uncouple the trailer from the tow vehicle, the operator may manually release the assembly by activating the handle 154 or other control device associated with the control panel. Both the safety cable and the control cable must be simultaneously retracted, so that the safety latch is released and the piston drawn up into the clearance position within bore 55. With the mouth thus unobstructed, the gudgeon is released. Thus, the operator must merely drive the tow vehicle away from the trailer and need not dismount the tow vehicle to effectuate the uncoupling.

Hence, use of the present hitch thus has proven most advantageous, because it greatly reduces labor requirements, substantially reduces the risk of physical injury to the driver and truckyard workers, and reduces fatalities commonly experienced in highway accidents.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A hitch assembly for automatically coupling a utility trailer to a conventional tow vehicle such as a tractor, said trailer having a drawbar equipped with a gudgeon, said assembly comprising:
    housing means for securing said assembly to said tow vehicle;
    mouth means defined within said housing means for receiving said gudgeon, said mouth means comprising outwardly diverging guide wall means for automatically, properly centering said gudgeon for coupling;
    a throat defined within said housing in communication with said mouth;
    an internal bore vertically defined within said housing means, said bore perpendicularly intersecting said mouth means;
    piston means slidably disposed within said bore for penetrating said gudgeon and thus locking said drawbar within said mouth, said piston means selectively displaceable between a clearance position unobstructing said mouth and a deployed position penetrating said mouth and capturing said gudgeon;
    a trigger assembly slidably disposed within said throat adjacent said bore for actuating said piston means in response to deflection by said gudgeon to a predetermined depth, said trigger assembly comprising:
        a rigid trigger block slidably disposed within said throat, said trigger block comprising an arcuate, generally concave front face conformed to receive said gudgeon, a rear wall defining a notch, a bottom, and a top, said top comprising an elongated follower slot;
        a rigid retainer slidably disposed upon said trigger block for engaging said piston means in its clearance position, said retainer comprising a downwardly extending follower projecting into said follower slot;
        spring means associated with said follower for biasing said retainer; mechanical switch means associated with said notch for linking said trigger block to an external control panel;
    whereby said gudgeon entering said mouth physically contacts said trigger block face and deflects said trigger block backwardly into said throat to said predetermined depth and said trigger block deflects said retainer out of engagement with said piston.

2. The assembly as defined in claim 1 wherein said piston means comprises a piston body, and a top and a bottom of smaller diameter than said piston body, and control cable means penetrating said housing for facilitating manual control of said piston from a remote position.

3. The assembly as defined in claim 2 wherein said bore comprises an upper portion terminating in an enlarged diameter peripheral counterbore for receiving said retainer and a lower portion comprising a chamfered shoulder and terminating in a reduced-diameter lower portion conformed to receive said bottom of said piston means and thereby limit downward travel of said piston within said bore.

4. The assembly as defined in claim 3 further comprising safety latch means for automatically locking said piston in said deployed position, said safety latch means comprising:
    a hollow channel penetrating said housing and communicating with said bore;
    locking cylinder means slidably disposed within said channel for penetrating said bore above said piston when said piston is in said deployed position; and,
    safety cable means for manually deactivating said safety latch means.

5. The assembly as defined in claim 4 wherein said guide wall means comprises a ceiling and a floor, said ceiling and said floor terminating in an outwardly flaring, contoured edge maintained in spaced-apart, generally parallel relation by a pair of generally convex, outwardly flaring side walls.

6. The assembly as defined in claim 5 wherein said housing means further comprises rigid plate means for mechanically retrofitting said assembly upon a desired tow vehicle in place of a conventional pintle-hook hitch assembly and an upwardly extending, generally conical portion for housing said bore.

7. The assembly as defined in claim 6 wherein said predetermined depth of deflection is equivalent to roughly one-fourth the outer diameter of said gudgeon.

8. An improved safety hitch device adapted to automatically mechanically engage and lock into position the gudgeon of a drawbar of a conventional utility trailer adapted for connection to a conventional tow vehicle for over-the-road hauling, said device comprising:
    mounting plate means for securing said device to the bumper of said tow vehicle;
    guide wall means for mechanically guiding said trailer tongue into the center of said hitch device, said guide wall means comprising:
        a substantially rectangular base portion;
        a pair of cooperating, elongated deflector walls; and,
        an interiorly defined gudgeon-receptive throat;
    tensioned piston means for engaging said gudgeon, said piston means operatively associated with a flexible cable for facilitating remote actuation of said piston means;
    casing means associated with said mounting plate means for housing said piston means, said casing means comprising an internal bore perpendicularly intersecting said throat;

said bore comprising an upper portion terminating in an enlarged diameter retainer-receptive counterbore and a lower portion terminating in a reduced-diameter portion whereby to limit downward travel of said piston within said bore;

wherein said piston means is selectively displaceable within said bore between a clearance position unobstructing said mouth and a deployed position penetrating said mouth and capturing said gudgeon;

tensioned trigger apparatus for automatically actuating said piston means when said drawbar gudgeon penetrates said throat to a predetermined depth, said trigger apparatus comprising:

a rigid trigger block slidably disposed within said throat, said trigger block comprising an arcuate, generally concave front face conformed to receive said gudgeon, a rear wall defining a notch, a bottom, and a top, said top comprising an elongated follower slot;

a rigid, planar retainer slidably disposed upon said top of said trigger block for engaging said piston means in its clearance position, said retainer comprising a downwardly extending follower projecting into said follower slot;

spring means associated with said follower for biasing said retainer;

mechanical switch means associated with said notch for linking said trigger block to an external control panel; and, whereby said gudgeon entering said throat physically deflects said trigger block face backwardly to said predetermined depth and said trigger block deflects said retainer out of engagement with said piston.

9. The hitch device defined in claim 8 including safety latch means for automatically locking said piston means into said gudgeon.

10. The hitch device defined in claim 9 wherein said safety latch means comprises:

a hollow channel penetrating said housing and communicating with said bore;

locking cylinder means slidably disposed within said channel for penetrating said bore above said piston when said piston is in said deployed position; and, safety cable means for manually deactivating said safety latch means.

11. The hitch device defined in claim 10 wherein said safety cable means mechanically links said safety latch means to said external control panel.

12. The hitch device defined in claim 10 wherein said base portion of said guide wall means defines a ceiling terminating in an upwardly flaring, contoured lip and a floor terminating in a downwardly flaring, contoured lip.

13. The hitch device defined in claim 12 wherein said retainer extends along said ceiling into said peripheral counterbore whereby to contact said bottom of said piston means and thus lock said piston means into its said clearance position.

14. The hitch device defined in claim 13 wherein said predetermined depth of deflection is equivalent to roughly one-fourth the outer diameter of said dudgeon.

15. The hitch device as defined in claim 14 wherein said control assembly comprises a flexible control cable extending between said piston and said control panel, a flexible safety cable extending between said safety latch assembly and said control panel, and handle means for facilitating simultaneous manual actuation of said control and safety cables.

* * * * *